(12) United States Patent
Watanabe

(10) Patent No.: US 11,805,330 B2
(45) Date of Patent: Oct. 31, 2023

(54) IMAGE RECOGNITION DEVICE, SOLID-STATE IMAGING DEVICE, AND IMAGE RECOGNITION METHOD

(71) Applicant: SONY SEMICONDUCTOR SOLUTIONS CORPORATION, Kanagawa (JP)

(72) Inventor: Goshi Watanabe, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 3 days.

(21) Appl. No.: 17/605,338

(22) PCT Filed: Apr. 30, 2020

(86) PCT No.: PCT/JP2020/018356
§ 371 (c)(1),
(2) Date: Oct. 21, 2021

(87) PCT Pub. No.: WO2020/230660
PCT Pub. Date: Nov. 19, 2020

(65) Prior Publication Data
US 2022/0232182 A1    Jul. 21, 2022

(30) Foreign Application Priority Data
May 10, 2019 (JP) .................. 2019-089782

(51) Int. Cl.
*H04N 25/589* (2023.01)
*G06V 10/82* (2022.01)
(Continued)

(52) U.S. Cl.
CPC ........... *H04N 25/589* (2023.01); *G06V 10/82* (2022.01); *H04N 23/61* (2023.01); *H04N 25/533* (2023.01)

(58) Field of Classification Search
CPC ........... H04N 5/35581; H04N 5/23218; H04N 5/3535; H04N 5/2355; H04N 5/35545;
(Continued)

(56) References Cited

U.S. PATENT DOCUMENTS

2004/0017497 A1   1/2004   Suzuki et al.
2009/0027530 A1   1/2009   Suzuki et al.
(Continued)

FOREIGN PATENT DOCUMENTS

CN          108292363 A     7/2018
DE      112017000231 T5     9/2018
(Continued)

OTHER PUBLICATIONS

Gormer S et al:"Multi-exposure image acquisition for automotive high dynamic range imaging", Intelligent Transportation Systems (ITSC), 2010 13th International IEEE Conference on, IEEE, Piscataway, NJ, USA,Sep. 19, 2010 (Sep. 19, 2010), 1881-1886, XP031792577, ISBN: 978-1-4244-7657-2 *the whole document*.
(Continued)

*Primary Examiner* — Mekonnen D Dagnew
(74) *Attorney, Agent, or Firm* — CHIP LAW GROUP

(57) ABSTRACT

Provided are an image recognition device, a solid-state imaging device, and an image recognition method capable of improving accuracy in recognizing a subject. The image recognition device according to the present disclosure includes an imaging unit and a recognition unit. The imaging unit captures a plurality of images having different sensitivities in one frame period to generate image data of the plurality of images. The recognition unit recognizes the subject from the image data of each of the images, and recognizes the subject captured in an image of one frame based on a result of recognizing the subject.

12 Claims, 11 Drawing Sheets

(51) Int. Cl.
*H04N 23/61* (2023.01)
*H04N 25/533* (2023.01)

(58) Field of Classification Search
CPC .. H04N 5/35563; H04N 5/3696; G06V 10/82; G06V 10/147; G06V 10/809; G06V 20/56; G06K 9/6267; G06N 3/0454; G06N 3/08
See application file for complete search history.

(56) References Cited

U.S. PATENT DOCUMENTS

| | | |
|---|---|---|
| 2012/0281133 A1 | 11/2012 | Kurita |
| 2018/0025141 A1 | 1/2018 | Chandraker et al. |
| 2018/0025213 A1 | 1/2018 | Chandraker et al. |
| 2018/0025217 A1 | 1/2018 | Chandraker et al. |
| 2018/0025242 A1 | 1/2018 | Chandraker et al. |
| 2018/0025243 A1 | 1/2018 | Chandraker et al. |
| 2018/0150725 A1* | 5/2018 | Tate ................... H04N 5/23229 |
| 2018/0316898 A1* | 11/2018 | Kaneko ................ H04N 9/0451 |
| 2019/0394377 A1 | 12/2019 | Zama et al. |

FOREIGN PATENT DOCUMENTS

| | | |
|---|---|---|
| HK | 1253269 A1 | 6/2019 |
| JP | 2001-051969 A | 2/2001 |
| JP | 2004-055786 A | 2/2004 |
| JP | 2007-235640 A | 9/2007 |
| JP | 2013-172378 A | 9/2013 |
| JP | 2014-103643 A | 6/2014 |
| JP | 2015-192222 A | 11/2015 |
| JP | 2018-152777 A | 9/2018 |
| JP | 2019-508801 A | 3/2019 |
| SG | 11201804580 U | 6/2018 |
| TW | 201905758 A | 2/2019 |
| WO | 2015/146006 A1 | 10/2015 |
| WO | 2018/017319 A1 | 1/2018 |
| WO | 2018/168222 A1 | 9/2018 |

OTHER PUBLICATIONS

Huan Yang et al: "Personalized Exposure Control Using Adaptive Metering and Reinforcement Learning", Arxiv.org, Cornell University Library, 201Olin Library Cornell University Ithaca, NY14853, Mar. 6, 2018 (Mar. 6, 2018), XP081177420, *the whole document*.
Wen-Chung Kao et al: "Adaptive exposure control and real-time image fusion for surveillance systems", 2006 IEEE International Symposium on Circuits and Systems May 21-24, 2006 Island of Kos, Greece, IEEE—Piscataway, NJ, USA, May 21, 2006 (May 21, 2006), pp. XP032457863, DOI: 10.1109/ISCAS.2006.1692740 ISBN: 978-0-7803-9389-9 * whole document*.
International Search Report and Written Opinion of PCT Application No. PCT/JP2020/018356, dated Aug. 11, 2020, 11 pages of ISRWO.

* cited by examiner

IMAGE RECOGNITION DEVICE, SOLID-STATE IMAGING DEVICE, AND IMAGE RECOGNITION METHOD

CROSS REFERENCE TO RELATED APPLICATIONS

This application is a U.S. National Phase of International Patent Application No. PCT/JP2020/018356 filed on Apr. 30, 2020, which claims priority benefit of Japanese Patent Application No. JP 2019-089782 filed in the Japan Patent Office on May 10, 2019. Each of the above-referenced applications is hereby incorporated herein by reference in its entirety.

FIELD

The present disclosure relates to an image recognition device, a solid-state imaging device, and an image recognition method.

BACKGROUND

There is an imaging device that includes a high dynamic range (HDR) imaging mode for generating an HDR image by capturing and combining a plurality of images having different sensitivities in one frame period, and recognizes a subject from the HDR image (see, for example, Patent Literature 1).

CITATION LIST

Patent Literature

Patent Literature 1: JP 2014-103643 A

SUMMARY

Technical Problem

However, in the above-described technology according to the related art, the accuracy in recognizing the subject may be deteriorated. Therefore, the present disclosure proposes an image recognition device, a solid-state imaging device, and an image recognition method capable of improving accuracy in recognizing a subject.

Solution to Problem

The image recognition device according to the present disclosure includes an imaging unit and a recognition unit. The imaging unit captures a plurality of images having different sensitivities in one frame period to generate image data of the plurality of images. The recognition unit recognizes the subject from the image data of each of the images, and recognizes the subject captured in an image of one frame based on a result of recognizing the subject.

DESCRIPTION OF EMBODIMENTS

Hereinafter, embodiments of the present disclosure will be described in detail with reference to the drawings. Note that, in each of the following embodiments, the same reference signs denote the same portions, and an overlapping description will be omitted.

1. First Embodiment

[1-1. Configuration of Image Recognition Device According to First Embodiment]

Figure 1:
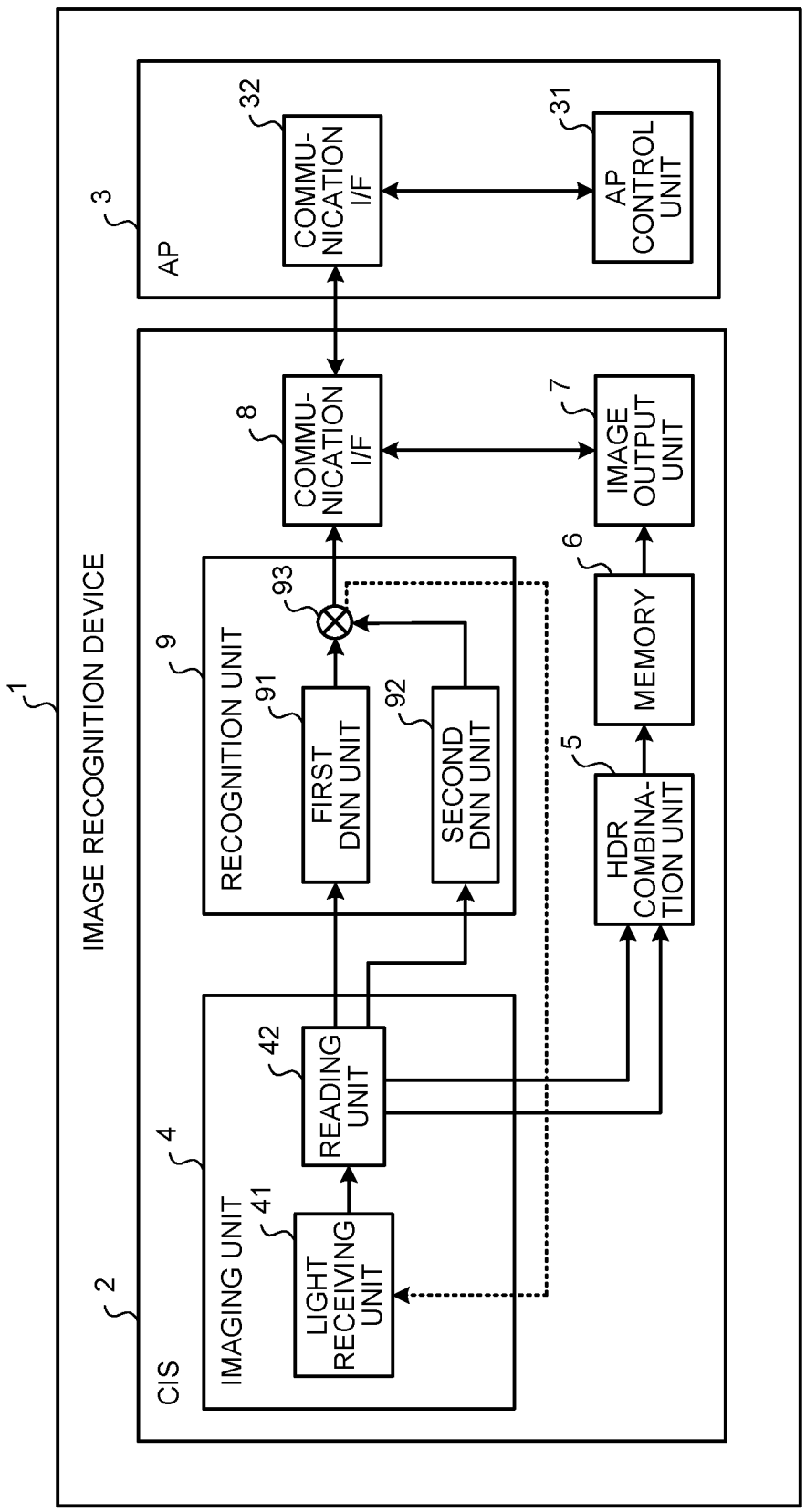
FIG. 1 is a diagram illustrating an example of a configuration of an image recognition device according to a first embodiment of the present disclosure.

FIG. 1 is a diagram illustrating an example of a configuration of an image recognition device 1 according to a first embodiment of the present disclosure. As illustrated in FIG. 1, the image recognition device 1 includes a complementary metal oxide semiconductor (CMOS) image sensor (hereinafter, referred to as a CIS 2) and an application processor (hereinafter, referred to as an AP 3).

The CIS 2 is an example of a solid-state imaging device that is configured with one chip and captures an image, and has a function of recognizing a subject in a captured image and outputting the subject recognition result to the AP 3 in addition to a function of capturing an image. Note that the solid-state imaging device according to the present disclosure is not limited to the CIS 2, and may be, for example, another image sensor such as a charge coupled device (CCD) image sensor.

The AP 3 includes an AP control unit 31, which is an example of a processor such as a central processing unit (CPU) that executes various application programs according to the application of the image recognition device 1, and a communication interface (I/F) 32 that performs information communication with the CIS 2.

For example, in a case where the image recognition device 1 is mounted on a vehicle and used as a sensor that detects an object or the like around the vehicle, when a subject such as a pedestrian is recognized by the CIS 2, the AP 3 executes processing of notifying a driver of the recognition or notifying an automatic braking system of the recognition.

In addition, for example, in a case where the image recognition device 1 is used in a face authentication system, the AP 3 executes processing of outputting, to the face authentication system, information indicating whether or not a face recognized by the CIS 2 is a face of a person registered in advance. In this manner, the AP 3 executes processing according to the application of the image recognition device 1 on the subject recognized by the CIS 2.

The CIS 2 has a function of capturing a plurality of images having different sensitivities in one frame period, which is a period in which an image of one frame is captured, and generating a high dynamic range (HDR) image by HDR combining the captured images, and a function of recognizing a subject in the captured image described above.

Specifically, the CIS 2 includes an imaging unit 4, a high dynamic range (HDR) combination unit 5, a memory 6, an image output unit 7, a communication I/F 8, and a recognition unit 9. The imaging unit 4 includes a light receiving unit 41 and a reading unit 42.

The light receiving unit 41 includes, for example, an optical system including a zoom lens, a focus lens, a diaphragm, and the like, and a pixel array unit in which unit pixels including light receiving elements such as photodiodes are arranged in a two-dimensional matrix form.

The light receiving unit 41 forms an image of light incident from the outside on a light receiving surface of the pixel array unit by an optical system. Each unit pixel of the pixel array unit performs photoelectric transformation on light incident on the light receiving element, thereby readably accumulating an electric charge corresponding to the amount of incident light.

The reading unit 42 includes a reading circuit that reads the electric charge accumulated in each unit pixel as a pixel signal, and an analog to digital converter (ADC) that generates digital image data by converting the analog pixel signal read by the reading circuit into a digital value.

In one frame period, the imaging unit 4 captures two images having different sensitivities, that is, a short-exposure image captured with an exposure time shorter than a normal exposure time and a long-exposure image captured with an exposure time longer than the normal exposure time.

As a result, the imaging unit 4 can capture the short-exposure image in which an image of the subject is clearly captured even in a case where the luminance of the subject is excessively high and the subject is overexposed in the normal exposure time. Further, the imaging unit 4 can capture the long-exposure image in which an image of the subject is clearly captured even in a case where the luminance of the subject is excessively low and the subject is underexposed in the normal exposure time. The imaging unit 4 outputs image data of the captured short-exposure image and image data of the captured long-exposure image to the HDR combination unit 5.

The HDR combination unit 5 includes, for example, a microcomputer including a central processing unit (CPU), a read only memory (ROM), a random access memory (RAM), and the like, and various circuits.

The HDR combination unit 5 generates image data of the HDR image by HDR-combining the image data of the short-exposure image and the image data of the long-exposure image input from the imaging unit 4 in a manner in which the CPU executes a program stored in the ROM using the RAM as a work area.

As a result, even in a case where both a dark region and a bright region are present within an angle of view in an image of one frame, the HDR combination unit 5 can generate the image data of the HDR image in which an image of the subject in the dark region and an image of the subject in the bright region are clearly captured.

Note that the HDR combination unit 5 may be implemented by hardware such as an application specific integrated circuit (ASIC) or a field programmable gate array (FPGA). The HDR combination unit 5 outputs the generated image data of the HDR image to the memory 6. The memory 6 is, for example, a storage device such as a flash memory, and stores the image data of the HDR image input from the HDR combination unit 5.

For example, the image output unit 7 reads the image data of the HDR image from the memory 6 and outputs the image data to the AP 3 via the communication I/F 8 only in a case where an HDR image acquisition request is received from the AP 3, and does not output the image data of the HDR image to the AP 3 in other cases.

As described above, since the image output unit 7 does not output the image data of the HDR image to the outside unless the HDR image acquisition request is received from the AP 3, the power consumption of the CIS 2 can be reduced, and security and privacy can be protected.

The recognition unit 9 includes, for example, a microcomputer including a CPU, a ROM, a RAM, and the like, and various circuits. The recognition unit 9 is a processing unit that recognizes a subject from image data of a captured image and outputs the subject recognition result to the AP 3 via the communication I/F 8 in a manner in which the CPU executes a program stored in the ROM using the RAM as a work area. Note that a part or all of the recognition unit 9 may be implemented by hardware such as an ASIC or an FPGA.

Here, for example, in a case where the subject is recognized from the image data of the HDR image, the accuracy in recognizing the subject may be deteriorated. Specifically, as described above, the HDR image is generated by HDR-combining the short-exposure image and the long-exposure image.

Since the short-exposure image and the long-exposure image are images captured with exposure times different from the normal exposure time, the short-exposure image and the long-exposure image may be images slightly different in luminance or color from the subject viewed by a human.

The HDR image generated by HDR-combining the short-exposure image and the long-exposure image as described above may include a secondarily generated artifact that does not actually exist. Therefore, in a case where the subject is recognized from the image data of the HDR image, the subject cannot be accurately recognized due to the artifact, and the accuracy in recognizing the subject may be deteriorated.

Therefore, the recognition unit 9 according to the present disclosure recognizes the subject from the image data of each of the images of the short-exposure image and the long-exposure image before the HDR combination that do not include the artifact, and recognizes the subject captured in the image of one frame based on the recognition result, thereby improving the accuracy in recognizing the subject.

Specifically, the recognition unit 9 includes a first deep neural network (DNN) unit 91, a second DNN unit 92, and a recognition result determination unit 93. The DNN is an algorithm having a multilayer structure in which a human cranial nerve circuit (neural network) designed by machine learning so as to recognize a feature (pattern) of a subject from image data is used as a model.

The first DNN unit 91 is a processing unit that recognizes the subject from the image data of the short-exposure image input from the imaging unit 4 by DNN processing using a DNN specialized to recognize the subject from the short-exposure image.

The first DNN unit 91 recognizes the subject captured in the short-exposure image, derives recognition result information including the subject recognition result and a DNN score indicating the level of reliability of the recognition result, and outputs the recognition result information to the recognition result determination unit 93.

As described above, since the first DNN unit 91 recognizes the subject by the DNN processing using the DNN specialized for the short-exposure image, it is possible to accurately recognize the subject from the image data of the short-exposure image.

The second DNN unit 92 is a processing unit that recognizes the subject from the image data of the long-exposure image input from the imaging unit 4 by DNN processing using a DNN specialized to recognize the subject from the long-exposure image.

The second DNN unit 92 recognizes the subject captured in the long-exposure image, derives recognition result information including the subject recognition result and a DNN score indicating the level of reliability of the recognition result, and outputs the recognition result information to the recognition result determination unit 93.

As described above, since the second DNN unit 92 recognizes the subject by the DNN processing using the DNN specialized for the long-exposure image, it is possible to accurately recognize the subject from the image data of the long-exposure image.

The recognition result determination unit 93 recognizes the subject captured in the image of one frame based on the recognition result information input from the first DNN unit 91 and the second DNN unit 92. For example, the recognition result determination unit 93 derives final recognition result information including a subject having a DNN score of a predetermined value or more and the DNN score of the subject, and outputs the final recognition result information to the AP 3 via the communication I/F 8.

Furthermore, according to the DNN score included in the recognition result information input from the first DNN unit 91 and the second DNN unit 92, the recognition result determination unit 93 adjusts the exposure time of the imaging unit 4 so that the subsequent DNN score is increased. An example of such an exposure time adjustment method will be described later with reference to FIGS. 3 and 4.

Note that the recognition result determination unit 93 is not an essential component. The recognition unit 9 may be configured to output the recognition result information derived by the first DNN unit 91 and the recognition result information derived by the second DNN unit 92 to the AP 3.

As described above, the recognition unit 9 recognizes the subject from the image data of each of the images of the short-exposure image and the long-exposure image before the HDR combination that do not include the artifact, and recognizes the subject captured in the image of one frame based on the subject recognition result. As a result, the recognition unit 9 can improve the accuracy in recognizing the subject as compared with a case of recognizing the subject from the HDR image in which the artifact may be included.

[1-2. Example of Operation of Image Recognition Device According to First Embodiment]

Figure 2:
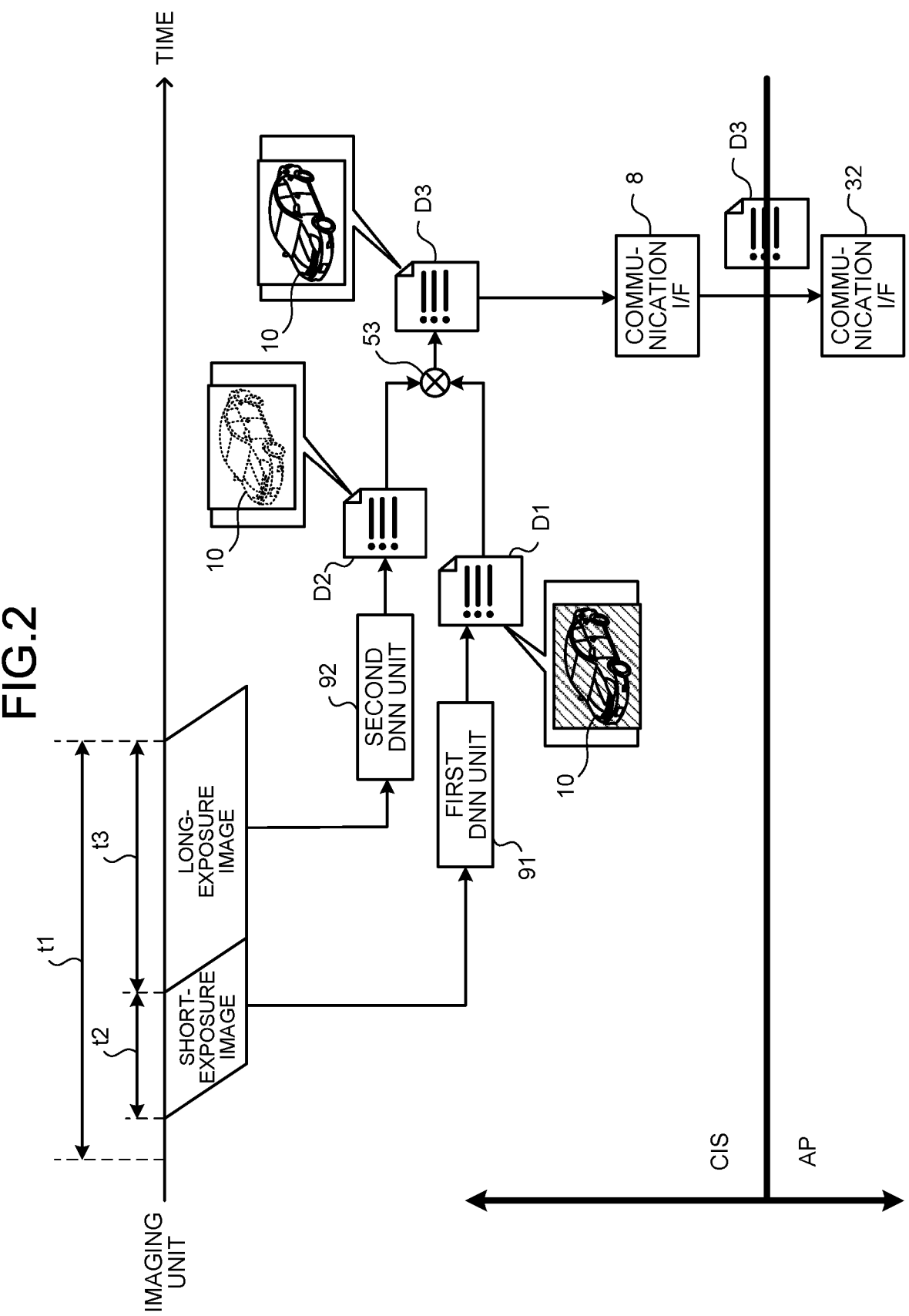
FIG. 2 is an explanatory diagram of an operation of the image recognition device according to the first embodiment of the present disclosure.

Next, an example of an operation of the image recognition device 1 according to the first embodiment will be described. FIG. 2 is an explanatory diagram of the operation of the image recognition device 1 according to the first embodiment of the present disclosure.

As illustrated in FIG. 2, during one frame period t1, the imaging unit 4 captures the short-exposure image whose exposure time is t2, and then captures the long-exposure image whose exposure time is t3 longer than t2. Then, the imaging unit 4 outputs the image data of the short-exposure image to the first DNN unit 91 and outputs the image data of the long-exposure image to the second DNN unit 92.

The first DNN unit 91 recognizes, for example, a vehicle 10 as the subject from the image data of the relatively dark short-exposure image, and outputs recognition result information D1 to the recognition result determination unit 93. The recognition result information D1 is not image data but metadata including information indicating the recognized subject and the DNN score described above.

The second DNN unit 92 recognizes, for example, the vehicle 10 as the subject from the image data of the relatively bright long-exposure image, and outputs recognition result information D2 to the recognition result determination unit 93. The recognition result information D2 is not image data but metadata including information indicating the recognized subject and the DNN score described above. At this time, the first DNN unit 91 and the second DNN unit 92 execute the DNN processing in parallel. As a result, the recognition unit 9 can shorten the time required for the subject recognition processing.

The recognition result determination unit 93 recognizes the vehicle 10 as the subject based on the recognition result information D1 and D2, and transmits final recognition result information D3 to the communication I/F 8. The final recognition result information D3 is also not image data but metadata including information indicating the recognized subject and the DNN score described above.

The communication I/F 8 outputs the recognition result information D3 to the communication I/F 32 of the AP 3. As described above, since the CIS 2 outputs the recognition result information D3, which is not image data but metadata, to the AP 3, power consumption can be reduced and privacy and security can be protected as compared with a case where the image data are output.

[1-3. Exposure Time Adjustment Method]

Figure 3:
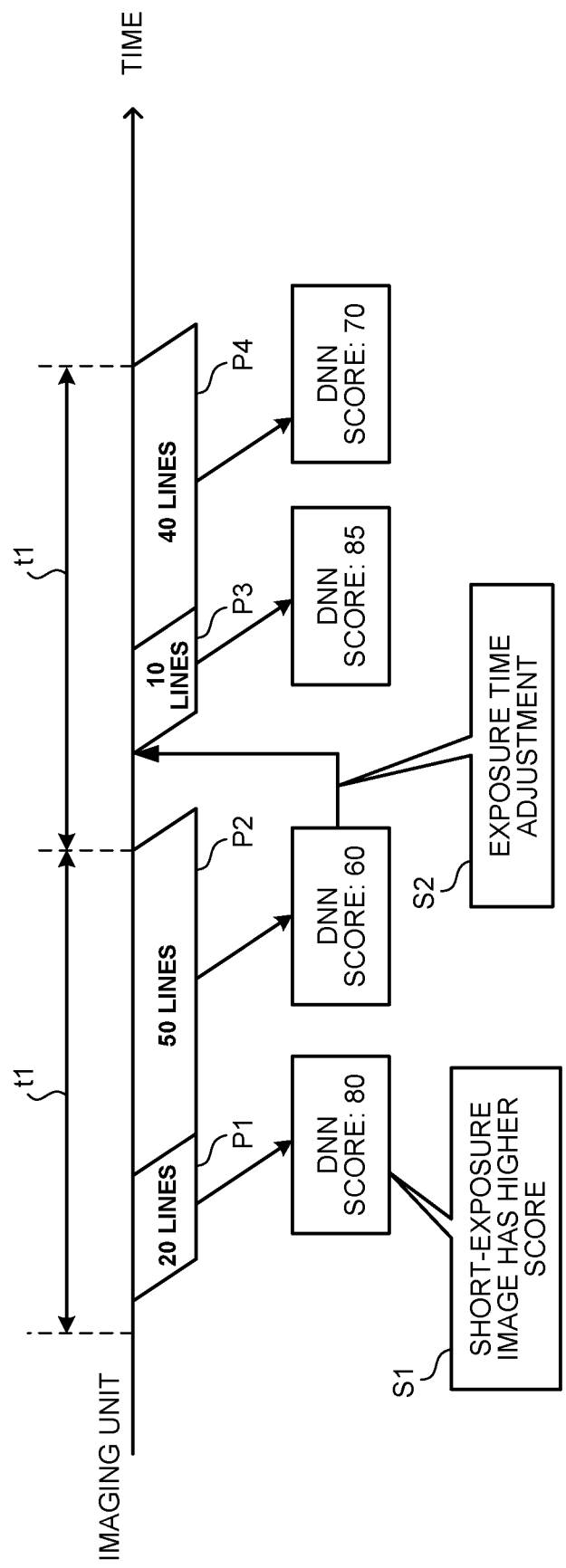
FIG. 3 is an explanatory diagram of an exposure time adjustment method according to the first embodiment of the present disclosure.
Figure 4:
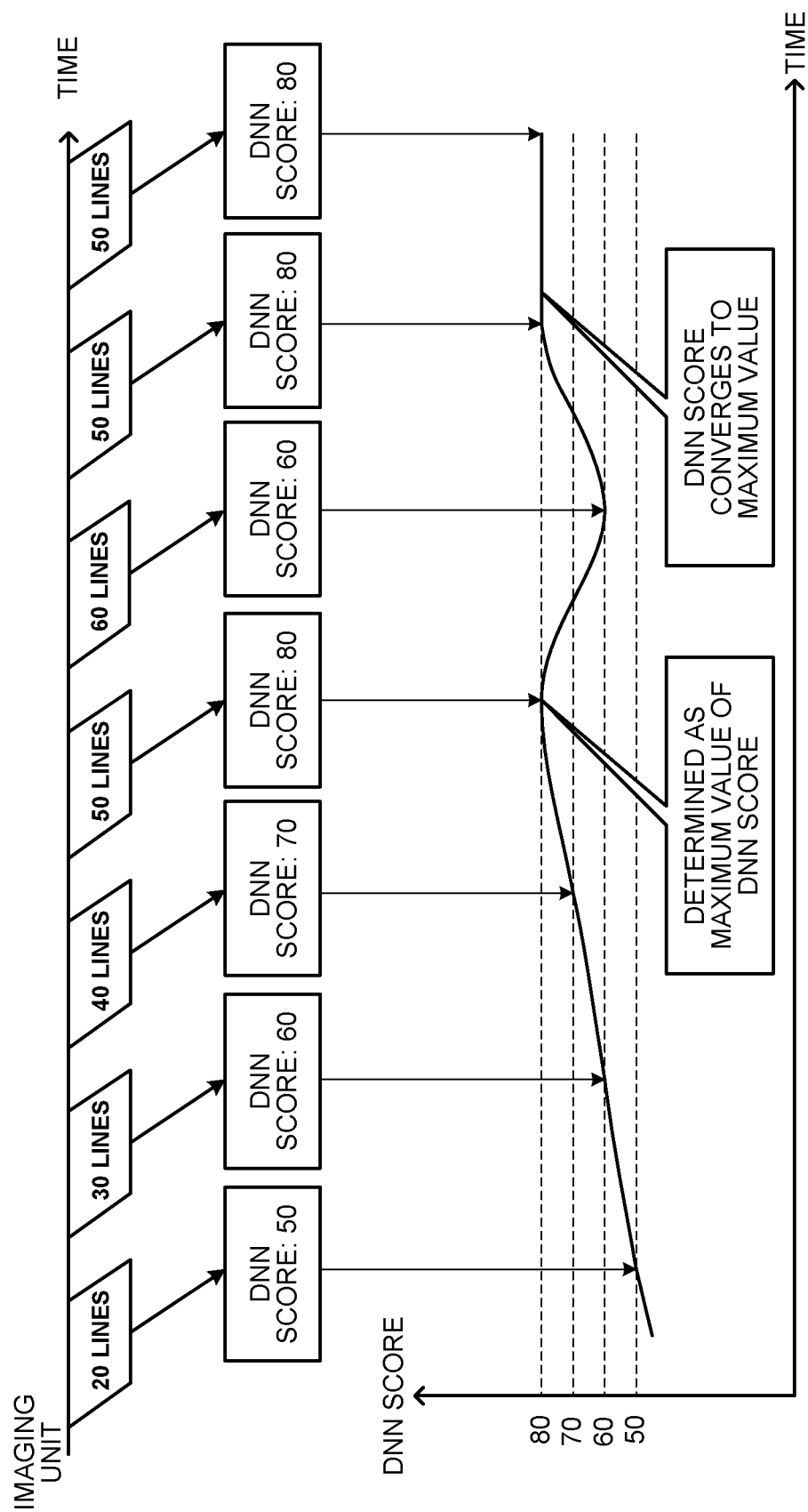
FIG. 4 is an explanatory diagram of the exposure time adjustment method according to the first embodiment of the present disclosure.

Next, an example of the exposure time adjustment method performed by the recognition result determination unit 93 will be described with reference to FIGS. 3 and 4. FIGS. 3 and 4 are explanatory diagrams of the exposure time adjustment method according to the first embodiment of the present disclosure. Note that 20 lines and 50 lines illustrated in FIGS. 3 and 4 are indices indicating the lengths of the exposure times, and a larger number of lines corresponds to a longer exposure time.

As illustrated in FIG. 3, for example, a DNN score of a short-exposure image P1 captured during the first one frame period t1 may be 80, and a DNN score of a long-exposure image P2 may be 60. In such a case, there is a high possibility that the DNN score of an imaging target at this time decreases as the exposure time increases.

Therefore, in a case where the short-exposure image has a higher score than the long-exposure image (Step S1), the recognition result determination unit 93 performs exposure time adjustment to shorten the exposure times of the short-exposure image and the long-exposure image to be captured in the next one frame period (Step S2).

For example, the recognition result determination unit 93 shortens an exposure time of a short-exposure image P3 to be captured next time from 20 lines to 10 lines, and shortens an exposure time of a long-exposure image P4 to be captured next time from 50 lines to 40 lines. As a result, the recognition result determination unit 93 can raise the DNN score of the short-exposure image to be captured next time from 80 to 85, for example, and can raise the DNN score of the long-exposure image to be captured next time from 60 to 70.

Furthermore, in a case where the long-exposure image has a higher score than the short-exposure image, the recognition result determination unit 93 performs exposure time adjustment to increase the exposure times of the short-exposure image and the long-exposure image to be captured in the next one frame period.

Note that the recognition result determination unit 93 may lower the DNN score in a case where the exposure time is excessively long or excessively short. Therefore, the recognition result determination unit 93 repeats the above-described exposure time adjustment until the DNN score converges to the maximum value.

For example, as illustrated in FIG. 4, in a case where the DNN score of the image captured with the exposure time of 20 lines for the first time is 50 and the DNN score of the image captured with the extended exposure time of 30 lines for the second time is raised to 60, the recognition result determination unit 93 further extends the exposure time for the third time.

In a case where the DNN score of the image captured with the extended exposure time of 40 lines for the third time is raised to 70, the recognition result determination unit 93 extends the exposure time to 50 lines to capture the image for the fourth time. Then, in a case where the DNN score of the image captured for the fourth time is raised to 80, the recognition result determination unit 93 extends the exposure time to 60 lines to capture the image for the fifth time.

At this time, in a case where the DNN score of the image captured for the fifth time is lowered to 60, the recognition result determination unit 93 determines 80, which is the DNN score of the image captured with the exposure time of 50 lines, as the maximum value of the DNN score.

Then, the recognition result determination unit 93 shortens the exposure time to 50 lines to capture the image for the sixth time. As a result, the DNN score of the image captured for the sixth time is raised to the maximum value of 80. Thereafter, the recognition result determination unit 93 maintains the exposure time at 50 lines to capture the image so that the DNN score of the captured image converges to 80, which is the maximum value. As a result, the recognition unit 9 can continuously derive the highly reliable subject recognition result of which the DNN score is the highest thereafter.

[1-4. Processing Executed by Recognition Unit]

Figure 5:
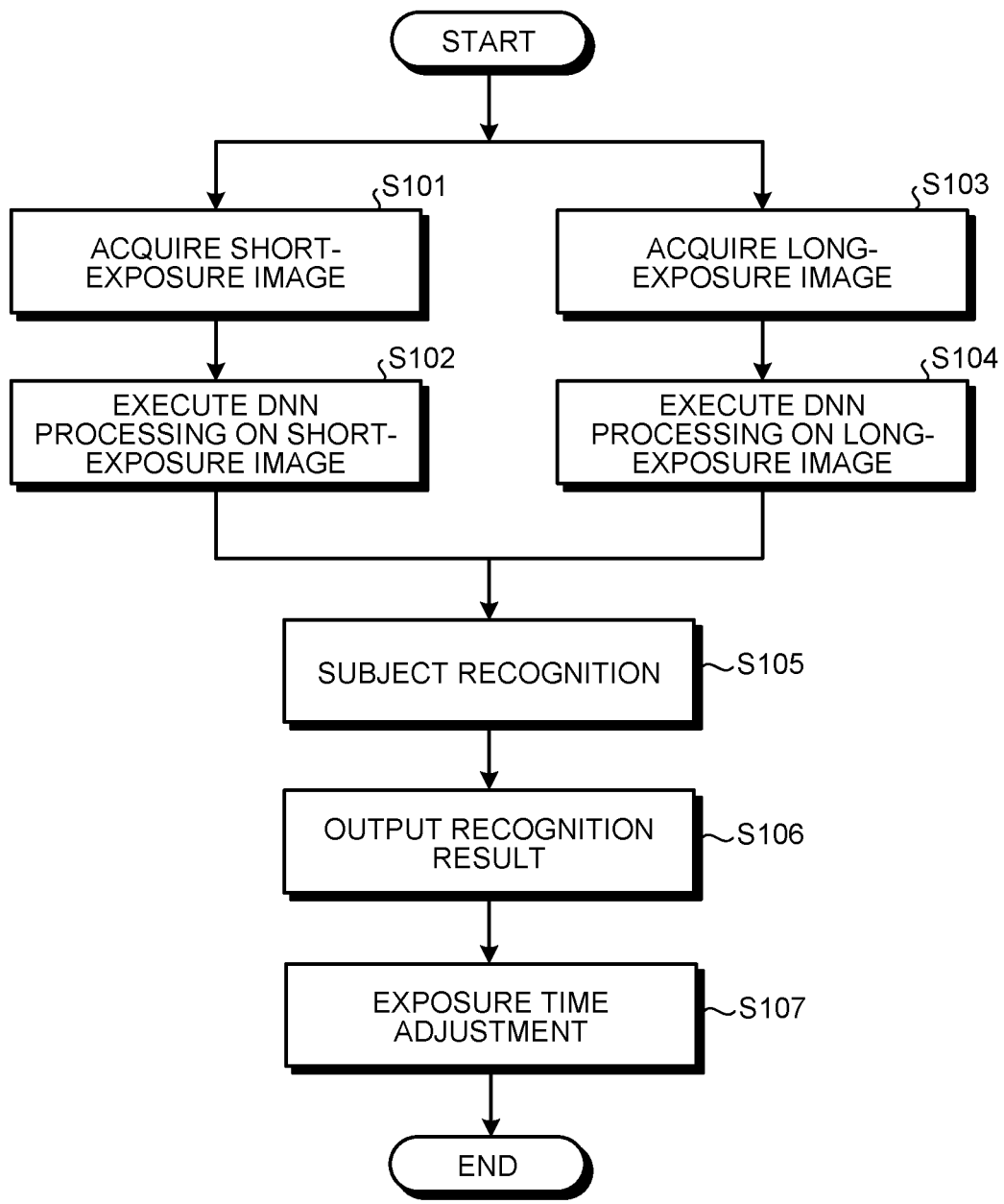
FIG. 5 is a flowchart illustrating an example of processing executed by a recognition unit according to the first embodiment of the present disclosure.

Next, an example of processing executed by the recognition unit 9 will be described with reference to FIG. 5. FIG. 5 is a flowchart illustrating an example of the processing executed by the recognition unit 9 according to the first embodiment of the disclosure. The recognition unit 9 executes the processing illustrated in FIG. 5 every time the short-exposure image and the long-exposure image are captured by the imaging unit 4.

Specifically, once the short-exposure image and the long-exposure image are captured by the imaging unit 4, the recognition unit 9 acquires image data of the short-exposure image from the imaging unit 4 (Step S101), and executes the DNN processing on the image data of the short-exposure image (Step S102).

In addition, the recognition unit 9 acquires the image data of the long-exposure image from the imaging unit 4 in parallel with the processing of Steps S101 and S102 (Step S103), and executes the DNN processing on the image data of the long-exposure image (Step S104).

Then, the recognition unit 9 recognizes the subject based on the subject recognition result information D1 that is a result of the DNN processing performed on the image data of the short-exposure image and the subject recognition result information D2 that is a result of the DNN processing performed on the image data of the long-exposure image (Step S105).

Thereafter, the recognition unit 9 outputs the final recognition result information D3, which is the subject recognition result, to the AP 3 via the communication I/F 8 (Step S106). Then, the recognition unit 9 adjusts the exposure time of the image to be captured by the imaging unit 4 according to the DNN score included in the recognition result information D1 and the recognition result information D2 (Step S107), and ends the processing.

[1-5. First Modification of Image Recognition Device]

Next, a first modification of the image recognition device 1 will be described. An image recognition device according to the first modification is different from the image recognition device 1 illustrated in FIG. 1 in that the recognition unit does not include two DNN units, the first DNN unit 91 and the second DNN unit 92, but includes one DNN, and other configurations thereof are similar to those of the image recognition device illustrated in FIG. 1.

For this reason, the entire configuration of the image recognition device according to the first modification will not be described repeatedly, and an operation of the image recognition device according to the first modification will be described with reference to FIG. 6. Furthermore, here, the same components as those illustrated in FIG. 2 are denoted by the same reference numerals as those illustrated in FIG. 2, and an overlapping description will be omitted.

Figure 6:
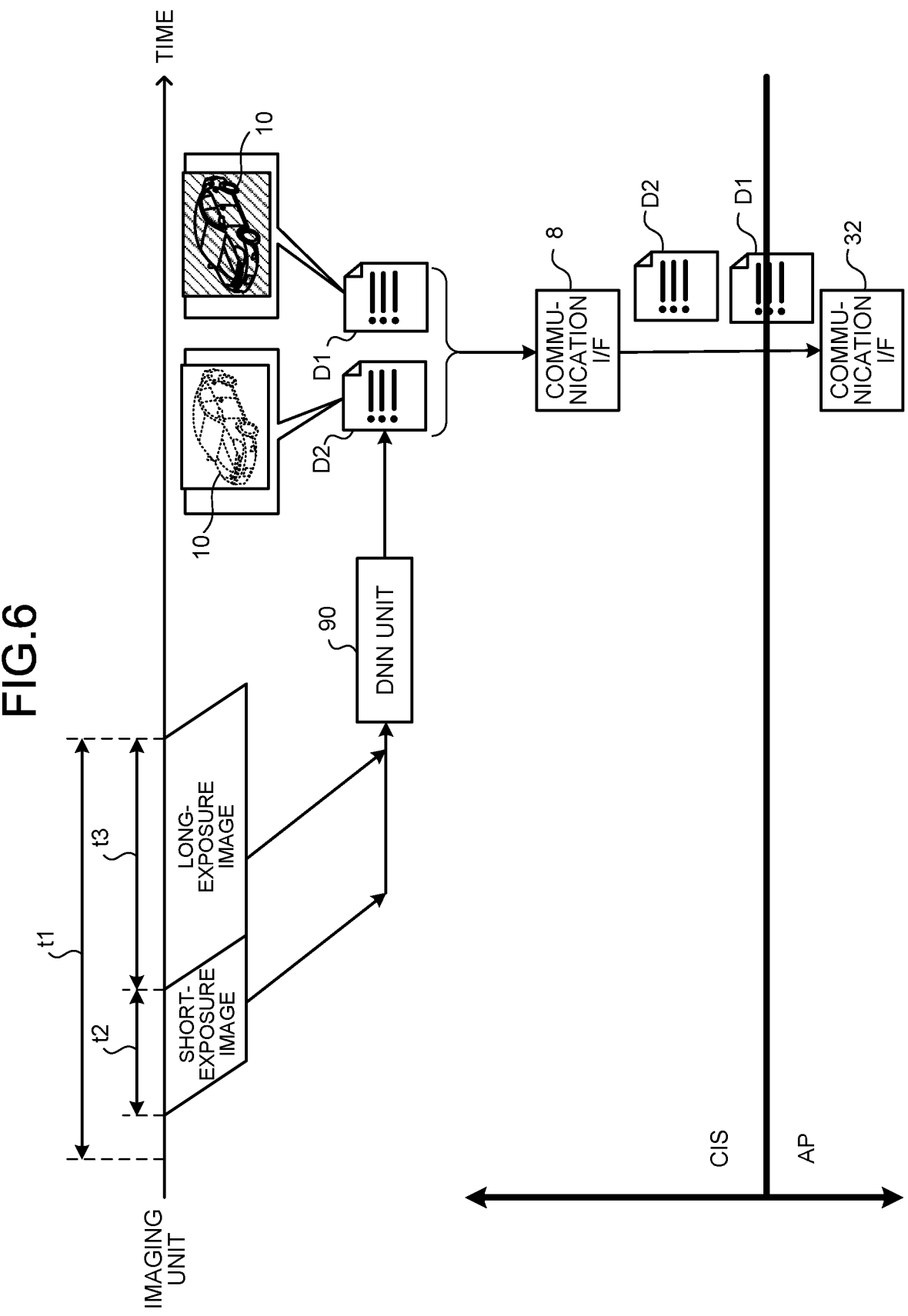
FIG. 6 is an explanatory diagram an operation of a first modification of the image recognition device according to the first embodiment of the present disclosure.

FIG. 6 is an explanatory diagram of an operation of the first modification of the image recognition device 1 according to the first embodiment of the present disclosure. As illustrated in FIG. 6, a DNN unit 90 according to the first modification acquires the short-exposure image and the long-exposure image from the imaging unit 4 in the order of imaging.

Then, the DNN unit 90 recognizes the subject by executing the DNN processing in time series in the order of acquiring the image data of the short-exposure image and the long-exposure image captured in one frame period. Then, the DNN unit 90 sequentially outputs, to the AP 3 via the communication I/F 8, the recognition result information D1 derived by executing the DNN processing on the image data of the short-exposure image and the recognition result information D2 derived by executing the DNN processing on the image data of the long-exposure image.

As described above, since the image recognition device according to the first modification recognizes the subject from the image data of the short-exposure image and the long-exposure image before the HDR combination that do not include the artifact, the accuracy in recognizing the subject captured in the image of one frame can be improved.

Furthermore, in the image recognition device according to the first modification, since the recognition unit includes one DNN unit 90, the circuit configuration can be simplified, such that the manufacturing cost can be reduced. Furthermore, in the image recognition device according to the first modification, since only one type of DNN is required to be used by the DNN unit 90, it is possible to reduce labor, time, and cost required for designing the DNN.

[1-6.1-5. Second Modification of Image Recognition Device]

Next, a second modification of the image recognition device 1 will be described. In an image recognition device according to the second modification, a configuration of a light receiving unit in an imaging unit is different from that of the image recognition device 1 illustrated in FIG. 1, and other configurations thereof are similar to those of the image recognition device illustrated in FIG. 1.

For this reason, the entire configuration of the image recognition device according to the second modification will not be described repeatedly, a configuration of a light receiving unit 41a according to the second modification will be described with reference to FIG. 7, and an operation of the image recognition device according to the second modification will be described with reference to FIG. 8. Furthermore, here, the same components as those illustrated in FIG. 2 are denoted by the same reference numerals as those illustrated in FIG. 2, and an overlapping description will be omitted.

Figure 7:
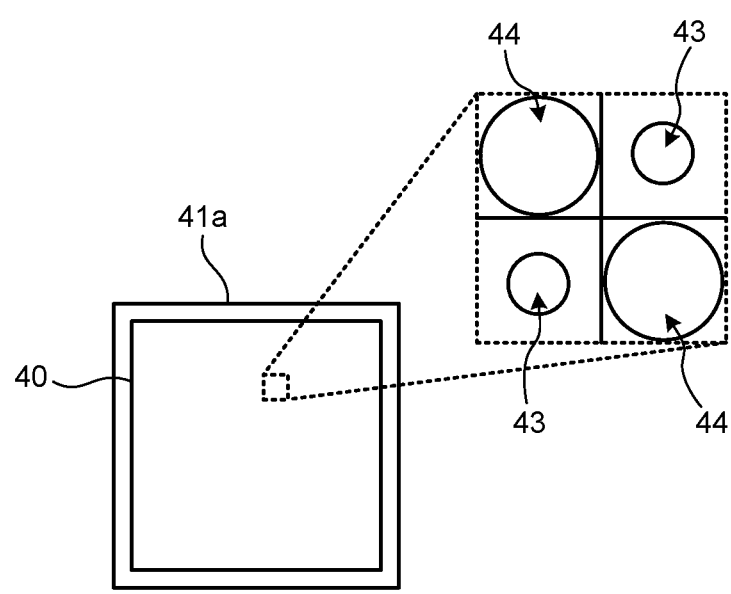
FIG. 7 is an explanatory diagram of a light receiving unit included in a second modification of the image recognition device according to the first embodiment of the present disclosure.

FIG. 7 is an explanatory diagram of the light receiving unit 41a included in the second modification of the image recognition device according to the first embodiment of the present disclosure. FIG. 8 is an explanatory diagram of the operation of the image recognition device according to the first embodiment. Note that FIG. 7 illustrates a plan view of the light receiving unit 41a and an enlarged view of a portion surrounded by a dotted line in a light receiving region 40 of the light receiving unit 41a.

As illustrated in FIG. 7, the light receiving unit 41a includes a small light receiving element 43 that is a photoelectric transformation element having a relatively small light receiving area, and a large light receiving element 44 that is a photoelectric transformation element having a relatively large light receiving area. In the light receiving unit 41a, for example, the small light receiving elements 43 and the large light receiving elements 44 are alternately arranged in longitudinal and lateral directions.

Since the small light receiving element 43 and the large light receiving element 44 have different light receiving areas, the amount of electric charge subjected to photoelectrical transformation and accumulated is different when exposure is performed for the same period of time. That is, in a case where the exposure times are the same, the small light receiving element 43 accumulates less electric charge than the large light receiving element 44.

With the light receiving unit 41a, it is possible to capture a single-shot HDR image capable of simultaneously capturing a first image simulating a short-exposure image obtained with a group of the small light receiving elements 43 as pixels and a second image simulating a long-exposure image obtained with a group of the large light receiving elements 44 as pixels in one exposure.

Figure 8:
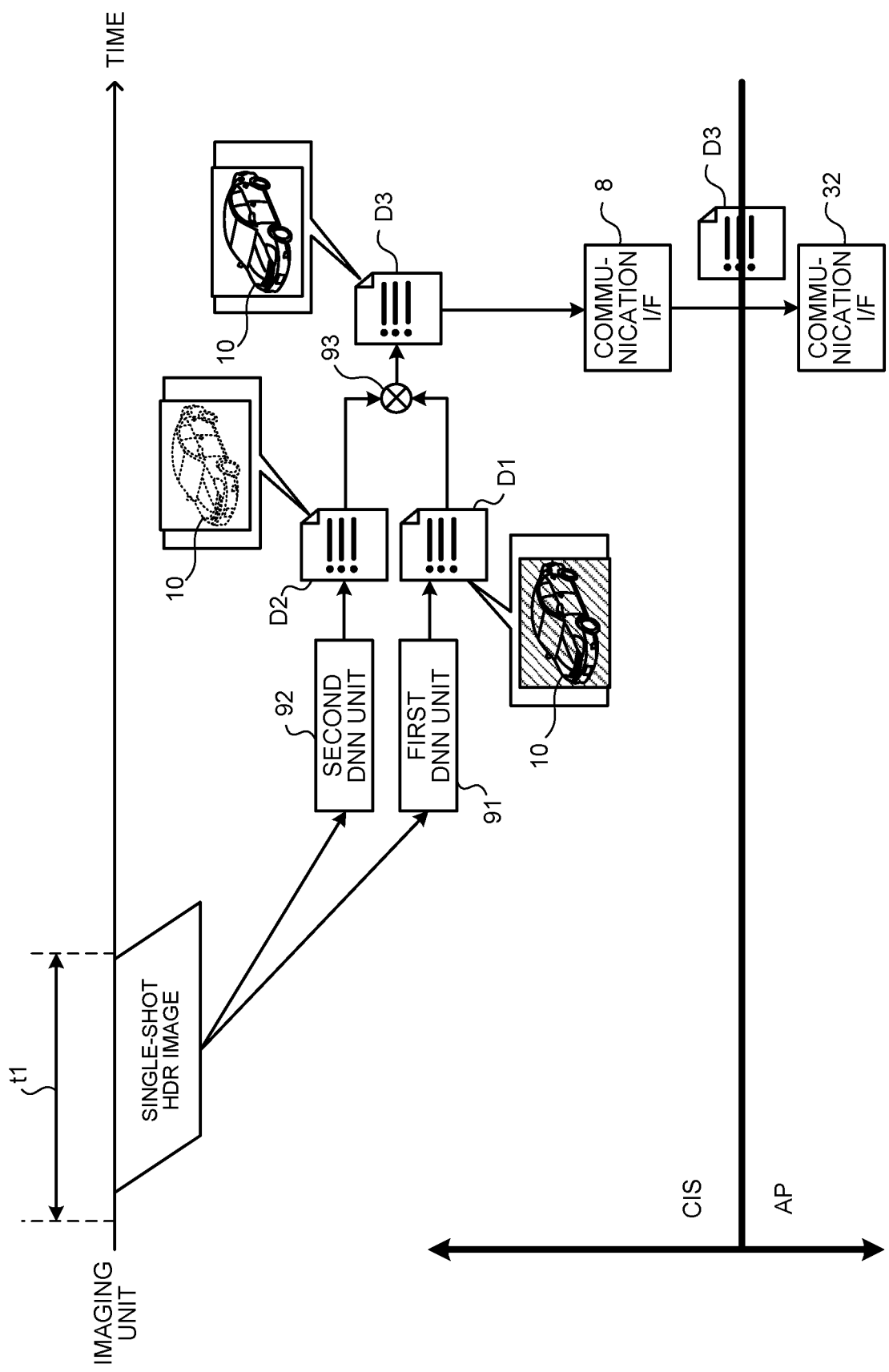
FIG. 8 is an explanatory diagram of an operation of the second modification of the image recognition device according to the first embodiment of the present disclosure.

As a result, as illustrated in FIG. 8, in the image recognition device according to the second modification, the first image included in the single-shot HDR image captured by the imaging unit in one frame period can be input to the first DNN unit 91, and the second image can be input to the second DNN unit 92 at the same time. As a result, the first DNN unit 91 and the second DNN unit 92 can simultaneously start the DNN processing and simultaneously end the DNN processing.

Therefore, the recognition result determination unit 93 does not need to wait until the recognition result information D1 of the first DNN unit 91 is input and then the recognition result information D2 of the second DNN unit 92 is input, as in a case where the short-exposure image and the long-exposure image are captured at a time interval.

Therefore, the recognition result determination unit 93 can shorten the time required for deriving the final recognition result information D3. Note that after deriving the final recognition result information D3, the image recognition device according to the second modification outputs the final recognition result information D3 to the AP 3 via the communication I/F 8, similarly to the operation of the image recognition device 1 illustrated in FIG. 2.

Furthermore, similarly to the image recognition device 1 illustrated in FIG. 1, the image recognition device according to the second modification recognizes the subject from image data of the first image and the second image before the HDR combination that do not include the artifact. Therefore, the accuracy in recognizing the subject captured in the image of one frame can be improved.

2. Second Embodiment

Figure 9:
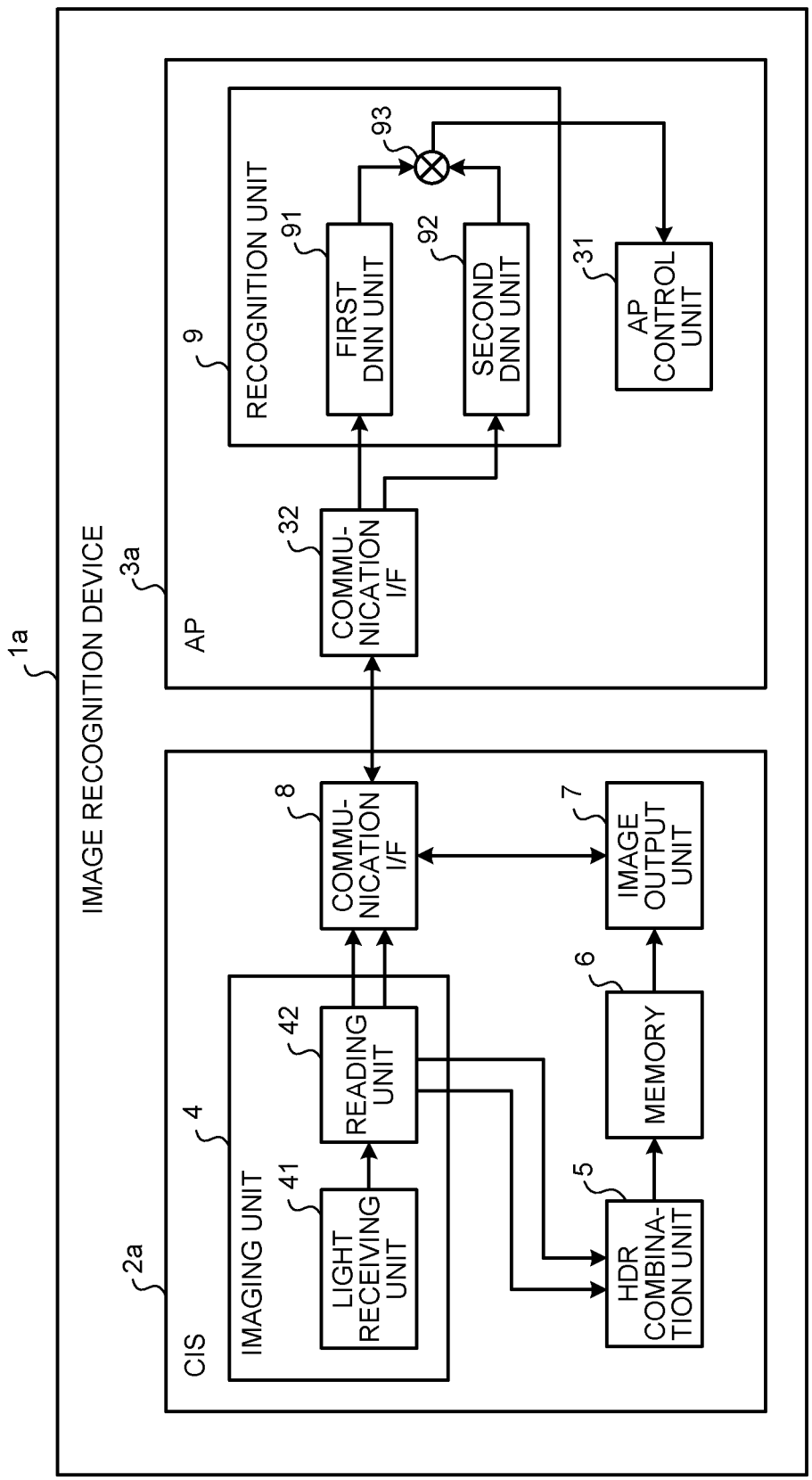
FIG. 9 is a diagram illustrating an example of a configuration of an image recognition device according to a second embodiment of the present disclosure.

Next, an image recognition device 1a according to a second embodiment will be described with reference to FIG. 9. FIG. 9 is a diagram illustrating an example of a configuration of the image recognition device 1a according to the second embodiment of the present disclosure. Note that, here, among the components illustrated in FIG. 9, the same components as those illustrated in FIG. 1 are denoted by the same reference numerals as those illustrated in FIG. 1, and a detailed description thereof will be omitted.

As illustrated in FIG. 9, the image recognition device 1a according to the second embodiment is different from the image recognition device 1 illustrated in FIG. 1 in that a CIS 2a does not include a recognition unit 9 and an AP 3 includes the recognition unit 9, and other configurations thereof are the same as those of the image recognition device 1 illustrated in FIG. 1.

An imaging unit 4 of the CIS 2a captures the short-exposure image and the long-exposure image, outputs image data of the short-exposure image and the long-exposure image to an HDR combination unit 5, and also outputs the image data to the AP 3 via a communication I/F 8.

The HDR combination unit 5 outputs, to a memory 6, an HDR image generated by HDR-combining the image data of the short-exposure image and the long-exposure image. The memory 6 stores the HDR image input from the HDR combination unit 5. An image output unit 7 reads the image data of the HDR image from the memory 6 and outputs the image data to the AP 3 only when a request for acquiring the HDR image is received from the AP 3.

The recognition unit 9 of the AP 3a executes processing similar to that of the recognition unit 9 according to the first embodiment. Specifically, a first DNN unit 91 recognizes the subject in the short-exposure image by executing DNN processing on the image data of the short-exposure image input from the CIS 2a via a communication I/F 32, and outputs the subject recognition result information D1 to a recognition result determination unit 93.

The second DNN unit 92 recognizes the subject in the long-exposure image by executing the DNN processing on the image data of the long-exposure image input from the CIS 2a via the communication I/F 32, and outputs the subject recognition result information D2 to the recognition result determination unit 93.

The recognition result determination unit 93 recognizes the subject captured in the image of one frame based on the recognition result information D1 input from the first DNN unit 91 and the recognition result information D2 input from the second DNN unit 92.

For example, the recognition result determination unit 93 derives the final recognition result information D3 including the subject having a DNN score of a predetermined value or more and the DNN score of the subject. Then, the recognition result determination unit 93 outputs the final recognition result information D3 to an AP control unit 31. The AP control unit 31 executes processing according to the application of the image recognition device 1 on the subject recognized by the recognition unit 9.

Also in the image recognition device 1a according to the second embodiment, the recognition unit 9 recognizes the subject from the image data of each of the images of the short-exposure image and the long-exposure image before the HDR combination that do not include the artifact, and recognizes the subject captured in the image of one frame based on the recognition result.

As a result, the image recognition device 1a can improve the accuracy in recognizing the subject as compared with a case of recognizing the subject from the HDR image that may include the artifact. Note that the configuration of the recognition unit 9 according to the second embodiment is not limited to the configuration illustrated in FIG. 9.

In addition, since the image recognition device 1a recognizes the subject in a manner in which the AP 3a having a higher information processing capability than the CIS 2a in general executes the DNN processing, it is possible to shorten the time required from capturing an image to deriving the subject recognition result.

For example, the recognition unit 9 according to the second embodiment may have a configuration similar to that of the recognition unit according to the first modification of the first embodiment. Furthermore, a light receiving unit 41 according to the second embodiment may have a configuration similar to that of the light receiving unit 41a according to the second modification of the first embodiment.

3. Example of Application to Moving Body

The technology (present technology) according to the present disclosure can be applied to various products. For example, the technology according to the present disclosure may be implemented as a device mounted in any one of moving bodies such as a vehicle, an electric vehicle, a hybrid electric vehicle, a motorcycle, a bicycle, a personal mobility device, a plane, a drone, a ship, and a robot.

Figure 10:
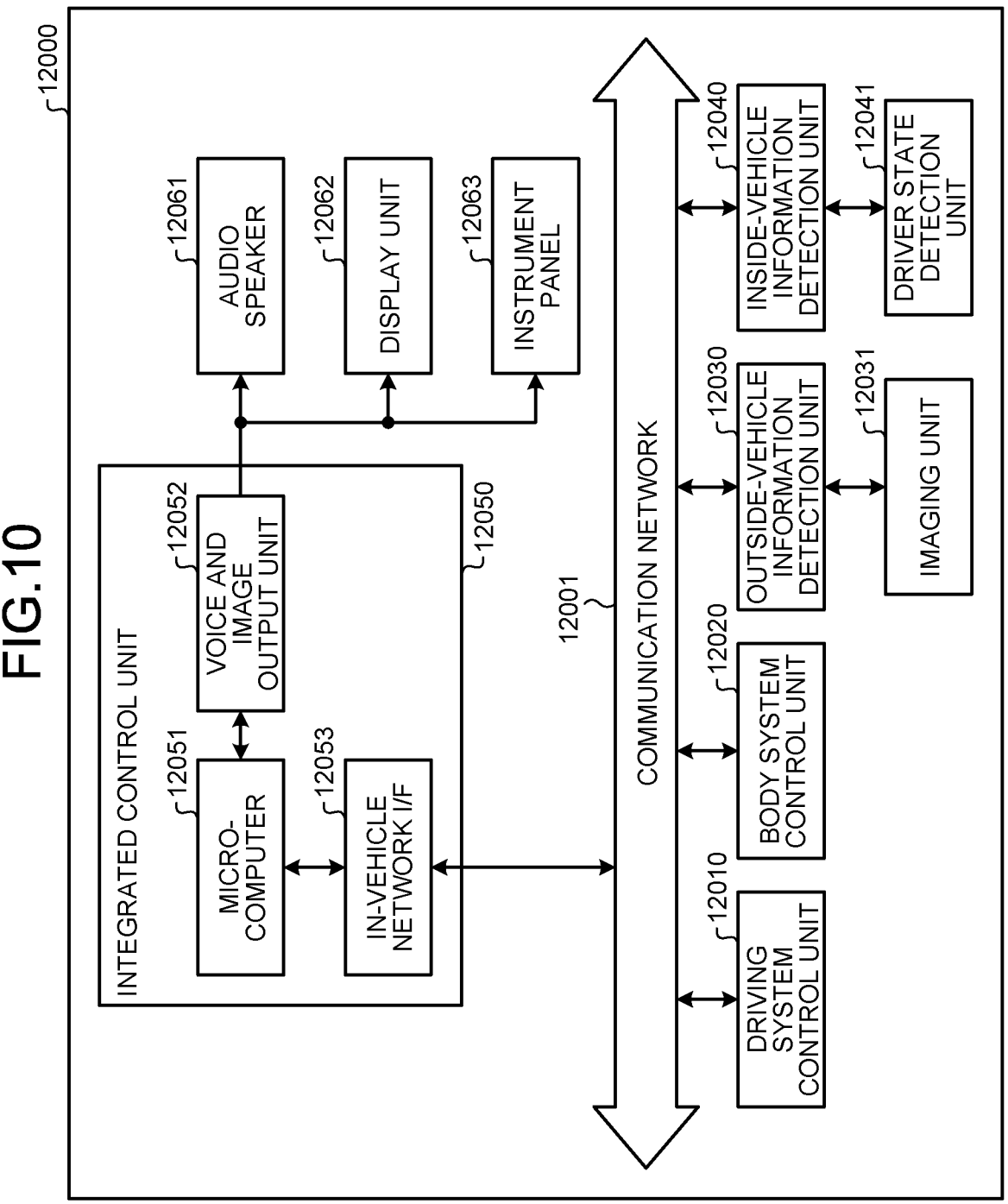
FIG. 10 is a block diagram illustrating an example of a schematic configuration of a vehicle control system.

FIG. 10 is a block diagram illustrating an example of a schematic configuration of a vehicle control system which is an example of a moving body control system to which the technology according to the present disclosure can be applied.

A vehicle control system 12000 includes a plurality of electronic control units connected through a communication network 12001. In the example illustrated in FIG. 10, the vehicle control system 12000 includes a driving system control unit 12010, a body system control unit 12020, an outside-vehicle information detection unit 12030, an inside-vehicle information detection unit 12040, and an integrated control unit 12050. Furthermore, as a functional configuration of the integrated control unit 12050, a microcomputer 12051, a voice and image output unit 12052, and an in-vehicle network interface (I/F) 12053 are illustrated.

The driving system control unit 12010 controls an operation of a device related to a driving system of a vehicle according to various programs. For example, the driving system control unit 12010 functions as a control device such as a driving force generation device for generating a driving force of a vehicle such as an internal combustion engine, a driving motor, or the like, a driving force transmission mechanism for transmitting a driving force to vehicle wheels, a steering mechanism for adjusting a steering angle of the vehicle, a brake device for generating a braking force of the vehicle, or the like.

The body system control unit 12020 controls an operation of various devices mounted in a vehicle body according to various programs. For example, the body system control unit 12020 functions as a keyless entry system, a smart key system, a power window device, or a control device for various lamps such as a head lamp, a back lamp, a brake lamp, a blinker, a fog lamp, and the like. In this case, electric waves sent from a portable machine substituting for a key and a signal of various switches can be input to the body system control unit 12020. The body system control unit 12020 receives the electric waves or the signal to control a door-lock device of a vehicle, a power window device, a lamp, or the like.

The outside-vehicle information detection unit 12030 detects information regarding an outside area of a vehicle in which the vehicle control system 12000 is mounted. For example, an imaging unit 12031 is connected to the outside-vehicle information detection unit 12030. The outside-vehicle information detection unit 12030 causes the imaging unit 12031 to capture an image of an area outside the vehicle, and receives the captured image. The outside-vehicle information detection unit 12030 may perform processing of detecting an object such as a person, a car, an obstacle, a sign, a letter on a road surface, or the like, or perform distance detection processing on the basis of the received image.

The imaging unit 12031 is an optical sensor that receives light and outputs an electric signal corresponding to the amount of received light. The imaging unit 12031 can output the electric signal as an image, or can output the electric signal as distance measurement information. Furthermore, the light received by the imaging unit 12031 may be visible light or invisible light such as infrared rays or the like.

The inside-vehicle information detection unit 12040 detects information regarding an inside area of the vehicle. For example, a driver state detection unit 12041 detecting a state of a driver is connected to the inside-vehicle information detection unit 12040. The driver state detection unit 12041 includes, for example, a camera capturing an image of the driver, and the inside-vehicle information detection unit 12040 may calculate a degree of fatigue or a degree of concentration of the driver, or discriminate whether or not the driver dozes off on the basis of detection information input from the driver state detection unit 12041.

The microcomputer 12051 can calculate a target control value of a driving force generation device, a steering mechanism, or a brake device on the basis of information regarding the inside area and the outside area of the vehicle, the information being acquired by the outside-vehicle information detection unit 12030 or the inside-vehicle information detection unit 12040, and output a control instruction to the driving system control unit 12010. For example, the microcomputer 12051 can perform a cooperative control for the purpose of implementing functions of an advanced driver assistance system (ADAS) including vehicle collision avoidance, impact alleviation, following traveling based on an inter-vehicle distance, traveling while maintaining a vehicle speed, a vehicle collision warning, a vehicle lane departure warning, or the like.

Furthermore, the microcomputer 12051 can perform a cooperative control for the purpose of an automatic driving in which a vehicle autonomously travels without an operation by a driver by controlling a driving force generation device, a steering mechanism, a brake device, or the like on the basis of information regarding a surrounding area of the vehicle acquired by the outside-vehicle information detection unit 12030 or the inside-vehicle information detection unit 12040, or the like.

Furthermore, the microcomputer 12051 can output a control instruction to the body system control unit 12020 on the basis of outside-vehicle information acquired by the outside-vehicle information detection unit 12030. For example, the microcomputer 12051 can perform a cooperative control for the purpose of preventing glare by controlling a headlamp according to a position of a preceding vehicle or an oncoming vehicle detected by the outside-vehicle information detection unit 12030 to switch a high beam to a low beam, or the like.

The voice and image output unit 12052 sends an output signal of at least one of voice or an image to an output device which is capable of visually or acoustically notifying a passenger of a vehicle or an outside area of the vehicle of information. In the example in FIG. 10, an audio speaker 12061, a display unit 12062, and an instrument panel 12063 are illustrated as the output devices. The display unit 12062 may include at least one of, for example, an on-board display or a head-up display.

Figure 11:
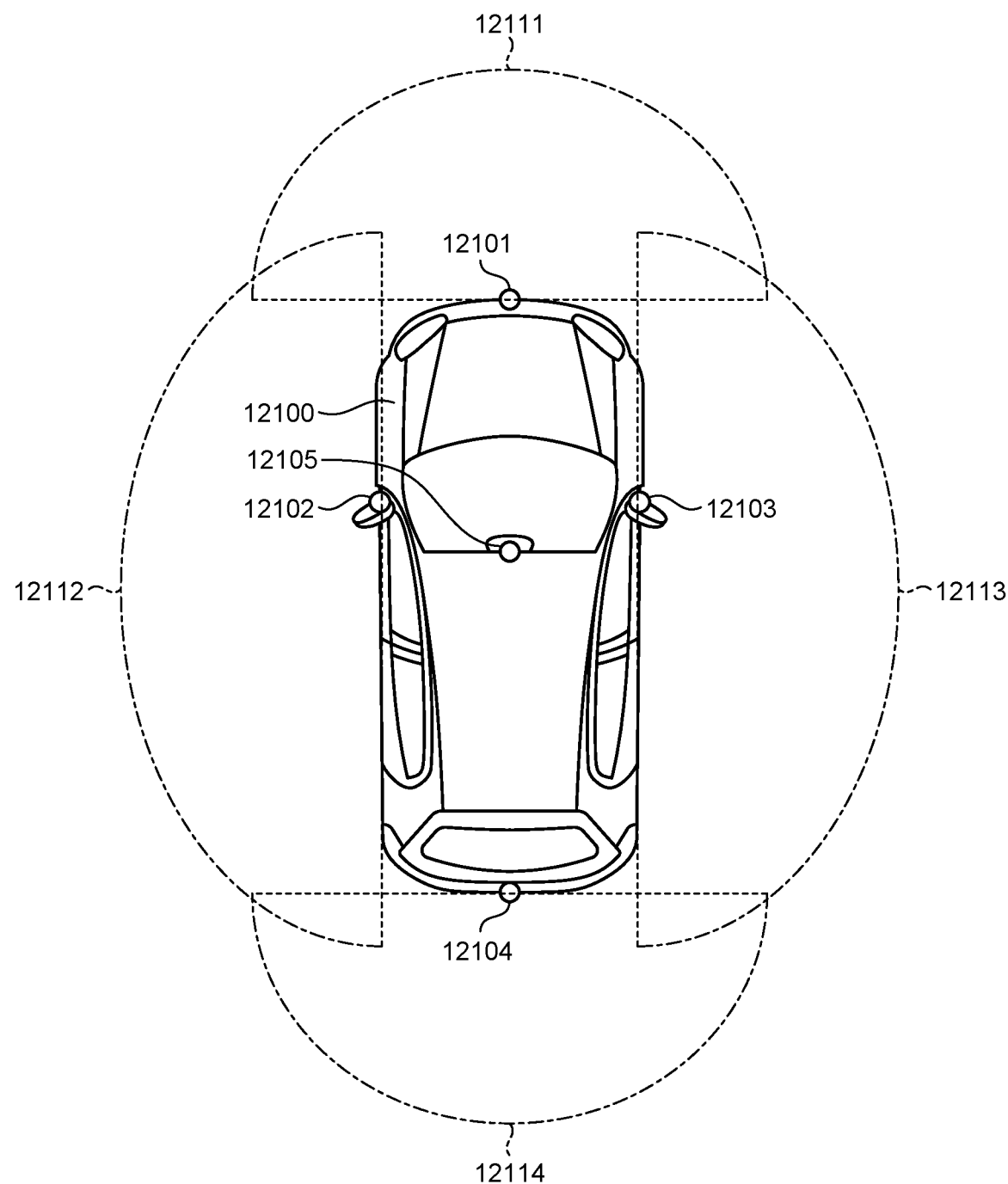
FIG. 11 is an explanatory diagram illustrating an example of installation positions of an outside-vehicle information detection unit and an imaging unit.

FIG. 11 is a diagram illustrating an example of an installation position of the imaging unit 12031.

In FIG. 11, a vehicle 12100 includes imaging units 12101, 12102, 12103, 12104, and 12105 as the imaging unit 12031.

The imaging units 12101, 12102, 12103, 12104, and 12105 are provided at, for example, a front nose, side mirrors, a rear bumper, a back door, an upper portion of a windshield in a compartment, and the like of the vehicle 12100. The imaging unit 12101 provided at the front nose and the imaging unit 12105 provided at the upper portion of the windshield in the compartment mainly acquire an image of an area in front of the vehicle 12100. The imaging units 12102 and 12103 provided at side mirrors mainly acquire images of areas on sides of the vehicle 12100. The imaging unit 12104 provided at the rear bumper or the back door mainly acquires an image of an area behind the vehicle 12100. The image of the area in front of the vehicle 12100 acquired by the imaging units 12101 and 12105 is mainly used to detect a preceding vehicle, a pedestrian, an obstacle, a traffic light, a traffic sign, a lane, or the like.

Note that FIG. 11 illustrates an example of imaging ranges of the imaging units 12101 to 12104. An image capturing range 12111 indicates an image capturing range of the imaging unit 12101 provided at the front nose, image capturing ranges 12112 and 12113 indicate image capturing ranges of the imaging units 12102 and 12103 provided at the side mirrors, respectively, and an image capturing range 12114 indicates an image capturing range of the imaging unit 12104 provided at the rear bumper or the back door. For example, image data captured by the imaging units 12101 to 12104 are superimposed, thereby obtaining a bird's eye view image from above the vehicle 12100.

At least one of the imaging units 12101 to 12104 may have a function of acquiring distance information. For example, at least one of the imaging units 12101 to 12104 may be a stereo camera including a plurality of image capturing elements, or may be an image capturing element with pixels for phase difference detection.

For example, the microcomputer 12051 can extract a three-dimensional object traveling at a predetermined speed (for example, 0 km/h or higher) in substantially the same direction as that of the vehicle 12100, particularly, the closest three-dimensional object on a traveling path of the vehicle 12100, as a preceding vehicle, by calculating a distance to each three-dimensional object in the image capturing ranges 12111 to 12114, and a temporal change (relative speed with respect to the vehicle 12100) in the distance on the basis of the distance information acquired from the imaging units 12101 to 12104. Moreover, the microcomputer 12051 can set an inter-vehicle distance to be secured in advance for a preceding vehicle, and can perform an automatic brake control (including a following stop control), an automatic acceleration control (including a following start control), and the like. As described above, a cooperative control for the purpose of an automatic driving in which a vehicle autonomously travels without an operation by a driver, or the like, can be performed.

For example, the microcomputer 12051 can classify and extract three-dimensional object data related to a three-dimensional object as a two-wheeled vehicle, an ordinary vehicle, a large vehicle, a pedestrian, and another three-dimensional object such as a power pole, on the basis of the distance information obtained from the imaging units 12101 to 12104, and use a result of the classification and extraction for automatic avoidance of obstacles. For example, the microcomputer 12051 identifies an obstacle around the vehicle 12100 as an obstacle that is visible to the driver of the vehicle 12100 or an obstacle that is hardly visible. Then, the microcomputer 12051 determines a collision risk indicating a risk of collision with each obstacle, and in a case where the collision risk is equal to or higher than a set value and there is a possibility of collision, the microcomputer 12051 can output an alarm to the driver through the audio speaker 12061 or the display unit 12062 or perform forced deceleration or avoidance steering through the driving system control unit 12010 to perform driving assistance for collision avoidance.

At least one of the imaging units 12101 to 12104 may be an infrared camera that detects infrared rays. For example, the microcomputer 12051 can recognize a pedestrian by determining whether or not a pedestrian is present in captured images of the imaging units 12101 to 12104. Such a recognition of a pedestrian is performed through a procedure for extracting feature points in the captured images of the imaging units 12101 to 12104 that are, for example, infrared cameras, and a procedure for discriminating whether or not an object is a pedestrian by performing pattern matching processing on a series of feature points indicating an outline of the object. In a case where the microcomputer 12051 determines that a pedestrian is present in the captured images of the imaging units 12101 to 12104 and recognizes the pedestrian, the voice and image output unit 12052 controls the display unit 12062 to superimpose a rectangular contour line for emphasis on the recognized pedestrian. Furthermore, the voice and image output unit 12052 may control the display unit 12062 to display an icon or the like indicating a pedestrian at a desired position.

Hereinabove, an example of the vehicle control system to which the technology according to the present disclosure can be applied has been described. The technology according to the present disclosure can be applied to, for example, the outside-vehicle information detection unit 12030, the imaging unit 12031, the inside-vehicle information detection unit 12040, the driver state detection unit 12041, and the like in the configuration described above. For example, the image recognition device 1 in FIG. 1 can be applied to the inside-vehicle information detection unit 12040 and the driver state detection unit 12041. By applying the technology according to the present disclosure to the inside-vehicle information detection unit 12040 and the driver state detection unit 12041, the accuracy in recognizing the driver as the subject is improved, such that it is possible to more accurately detect the degree of fatigue, the degree of concentration, whether or not the driver is dozing, and the like.

4. Effects

The image recognition device 1 includes the imaging unit 4 and the recognition unit 9. The imaging unit 4 captures a plurality of images having different sensitivities in one frame period to generate image data of the plurality of images. The recognition unit 9 recognizes a subject from the image data of each of the images, and recognizes the subject captured in an image of one frame based on the result of recognizing the subject. As a result, the image recognition device 1 can improve the accuracy in recognizing the subject by recognizing the subject from the image data before the HDR combination that do not include the artifact.

Furthermore, the image recognition device 1 includes the CIS 2 which is an example of the solid-state imaging device including the imaging unit 4 and the recognition unit 9. As a result, in the image recognition device 1, the recognition of the subject can be performed inside the CIS 2 without outputting the image data from the CIS 2 to the outside. Therefore, the image recognition device 1 can reduce the power consumption of the CIS 2 and protect the privacy and security of the subject.

Furthermore, the image recognition device 1a includes the CIS 2a, which is an example of the solid-state imaging device including the imaging unit 4, and the AP 3a, which is an example of the processor including the recognition unit 9. As a result, the image recognition device 1a can improve the accuracy in recognizing the subject and further shorten the time required to derive the subject recognition result.

Furthermore, the recognition unit 9 recognizes the subject from the image data of each of the images by executing the DNN processing using the deep neural network (DNN). As a result, the recognition unit 9 can derive a highly reliable subject recognition result.

Furthermore, the recognition unit 9 recognizes the subject by executing the DNN processing on image data of a plurality of images captured in one frame period in time series. The recognition unit 9 can recognize the subject from a plurality of images by using one type of DNN. As a result, the image recognition device 1 can reduce labor, time, and cost required for designing the DNN used for recognizing the subject.

Furthermore, the recognition unit 9 recognizes the subject by executing the DNN processing on image data of a plurality of images captured in one frame period in parallel. As a result, the recognition unit 9 can shorten the time required for the subject recognition processing.

Furthermore, the recognition unit 9 recognizes the subject by executing the DNN processing using the DNN specialized for each of the images having different sensitivities. As a result, the image recognition device 1 can recognize the subject captured in an image having a dynamic range equivalent to that of the HDR image with high accuracy.

In addition, the imaging unit 4 captures a plurality of images having different exposure times. As a result, as a result, the image recognition device 1 can recognize the subject captured in an image having a dynamic range equivalent to that of the HDR image with high accuracy.

Furthermore, the recognition unit 9 adjusts the exposure time of the imaging unit 4 according to the accuracy of the subject recognition result. As a result, the image recognition device 1 can further improve the subject recognition result by recognizing the subject from the image captured with the exposure time suitable for recognizing the subject.

Furthermore, the recognition unit 9 repeats the adjustment of the exposure time of the imaging unit 4 until the accuracy of the subject recognition result converges to the maximum value. As a result, the image recognition device 1 can further improve the subject recognition result by recognizing the subject from the image captured with the exposure time optimal for the recognition of the subject.

In addition, the imaging unit 4 captures a plurality of images by the small light receiving element 43 and the large light receiving element 44 which are light receiving elements provided in the light receiving region 40 and having different light receiving areas. As a result, the image recognition device 1 can recognize the subject captured in an image having a dynamic range equivalent to that of the HDR image with high accuracy.

The CIS 2, which is an example of the solid-state imaging device, includes the imaging unit 4 and the recognition unit 9. The imaging unit 4 captures a plurality of images having different sensitivities in one frame period to generate image data of the plurality of images. The recognition unit 9 recognizes a subject from the image data of each of the images, and recognizes the subject captured in an image of one frame based on the result of recognizing the subject. As a result, the CIS 2 can improve the accuracy in recognizing the subject by recognizing the subject from the image data before the HDR combination that do not include the artifact.

In an image recognition method, a plurality of images having different sensitivities are captured in one frame period to generate image data of the plurality of images, a subject is recognized from the image data of each of the images, and the subject captured in an image of one frame is recognized based on the result of recognizing the subject. As a result, with the image recognition method, it is possible to improve the accuracy in recognizing the subject by recognizing the subject from the image data before the HDR combination that do not include the artifact.

Note that the effects in each embodiment described in the present specification are merely examples. The effects of the present disclosure are not limited thereto, and other effects may be obtained.

Note that the present technology can also have the following configurations.

(1)

An image recognition device including:

an imaging unit that captures a plurality of images having different sensitivities in one frame period to generate image data of the plurality of images; and a recognition unit that recognizes a subject from the image data of each of the images and recognizes the subject captured in an image of one frame based on a result of recognizing the subject.

(2)

The image recognition device according to (1), wherein the image recognition device comprises a solid-state imaging device that includes the imaging unit and the recognition unit.

(3)

The image recognition device according to (1), wherein the image recognition device comprises:
a solid-state imaging device that includes the imaging unit; and
a processor that includes the recognition unit.

(4)
The image recognition device according to any one of (1) to (3), wherein
the recognition unit recognizes the subject from the image data of each of the images by executing DNN processing using a deep neural network (DNN).

(5)
The image recognition device according to (4), wherein
the recognition unit recognizes the subject by executing the DNN processing on image data of a plurality of images captured in one frame period in time series.

(6)
The image recognition device according to (4), wherein
the recognition unit recognizes the subject by executing the DNN processing on image data of a plurality of images captured in one frame period in parallel.

(7)
The image recognition device according to any one of (4) to (6), wherein
the recognition unit recognizes the subject by executing the DNN processing using a DNN specialized for each of the images having different sensitivities.

(8)
The image recognition device according to any one of (1) to (7), wherein
the imaging unit captures the plurality of images having different exposure times.

(9)
The image recognition device according to (8), wherein
the recognition unit adjusts the exposure time of the imaging unit according to a level of reliability of the result of recognizing the subject.

(10)
The image recognition device according to (9), wherein
the recognition unit repeats the adjustment of the exposure time of the imaging unit until the level of reliability of the result of recognizing the subject converges to a maximum value.

(11)
The image recognition device according to any one of (1) to (10), wherein
the imaging unit captures the plurality of images by light receiving elements provided in a light receiving region and having different light receiving areas.

(12)
A solid-state imaging device including:
an imaging unit that captures a plurality of images having different sensitivities in one frame period to generate image data of the plurality of images; and
a recognition unit that recognizes a subject from the image data of each of the images and recognizes the subject captured in an image of one frame based on a result of recognizing the subject.

(13)
An image recognition method including:
capturing a plurality of images having different sensitivities in one frame period to generate image data of the plurality of images; and
recognizing a subject from the image data of each of the images and recognizing the subject captured in an image of one frame based on a result of recognizing the subject.

REFERENCE SIGNS LIST 1, 1a IMAGE RECOGNITION DEVICE
2, 2a CIS
3, 3a AP
31 AP CONTROL UNIT
32 COMMUNICATION I/F
4 IMAGING UNIT
40 LIGHT RECEIVING REGION
41, 41a LIGHT RECEIVING UNIT
42 READING UNIT
43 SMALL LIGHT RECEIVING ELEMENT
44 LARGE LIGHT RECEIVING ELEMENT
5 HDR COMBINATION UNIT
6 MEMORY
7 IMAGE OUTPUT UNIT
8 COMMUNICATION I/F
9 RECOGNITION UNIT
90 DNN UNIT
91 FIRST DNN UNIT
92 SECOND DNN UNIT
93 RECOGNITION RESULT DETERMINATION UNIT

The invention claimed is:

1. An image recognition device, comprising:
an imaging unit configured to:
capture, in one frame period, a plurality of images having different exposure times; and
generate image data of the captured plurality of images; and
a recognition unit configured to:
recognize a subject from the generated image data of the plurality of images;
recognize the subject in an image of one frame based on a result of the recognition of the subject from the generated image data; and
adjust an exposure time of the imaging unit based on a level of reliability of the result of the recognition of the subject.

2. The image recognition device according to claim 1, wherein
the image recognition device comprises a solid-state imaging device, and
the solid-state imaging device includes the imaging unit and the recognition unit.

3. The image recognition device according to claim 1, further comprising:
a solid-state imaging device that includes the imaging unit; and
a processor that includes the recognition unit.

4. The image recognition device according to claim 1, wherein the recognition unit is further configured to execute a deep neural network (DNN) process to recognize the subject from the generated image data.

5. The image recognition device according to claim 4, wherein the recognition unit is further configured to execute the DNN process on the generated image data of the plurality of images in time series.

6. The image recognition device according to claim 4, wherein the recognition unit is further configured to execute the DNN process on the generated image data of the plurality of images in parallel.

7. The image recognition device according to claim 4, wherein the recognition unit is further configured to execute the DNN process based on a DNN specialized for each image of the plurality of images having different exposure times.

8. The image recognition device according to claim 1, wherein the recognition unit is further configured to repeat the adjustment of the exposure time of the imaging unit until the level of reliability of the result of the recognition of the subject converges to a maximum value.

9. The image recognition device according to claim 1, further comprising a light receiving region that includes a plurality of light receiving elements, wherein
the plurality of light receiving elements have different light receiving areas, and
the imaging unit is further configured to capture the plurality of images by the plurality of light receiving elements.

10. The image recognition device according to claim 1, further comprising a high dynamic range (HDR) combination unit configured to generate image data of an HDR image by HDR-combining the generated image data of the plurality of images, wherein
the recognition unit is further configured to recognize the subject from the generated image data of the plurality of images before the HDR combination of the generated image data.

11. A solid-state imaging device, comprising:
an imaging unit configured to:
capture, in one frame period, a plurality of images having different exposure times; and
generate image data of the captured plurality of images; and
a recognition unit configured to:
recognize a subject from the generated image data of the plurality of images;
recognize the subject in an image of one frame based on a result of the recognition of the subject from the generated image data; and
adjust an exposure time of the imaging unit based on a level of reliability of the result of the recognition of the subject.

12. An image recognition method, comprising:
capturing, by an imaging unit, a plurality of images having different exposure times in one frame period;
generating image data of the captured plurality of images;
recognizing a subject from the generated image data of the plurality of images;
recognizing the subject in an image of one frame based on a result of the recognition of the subject from the generated image data; and
adjusting an exposure time of the imaging unit based on a level of reliability of the result of the recognition of the subject.

* * * * *